Aug. 21, 1945.    G. H. MILLER    2,383,407
AGRICULTURAL IMPLEMENTS
Filed Aug. 10, 1942    2 Sheets-Sheet 1
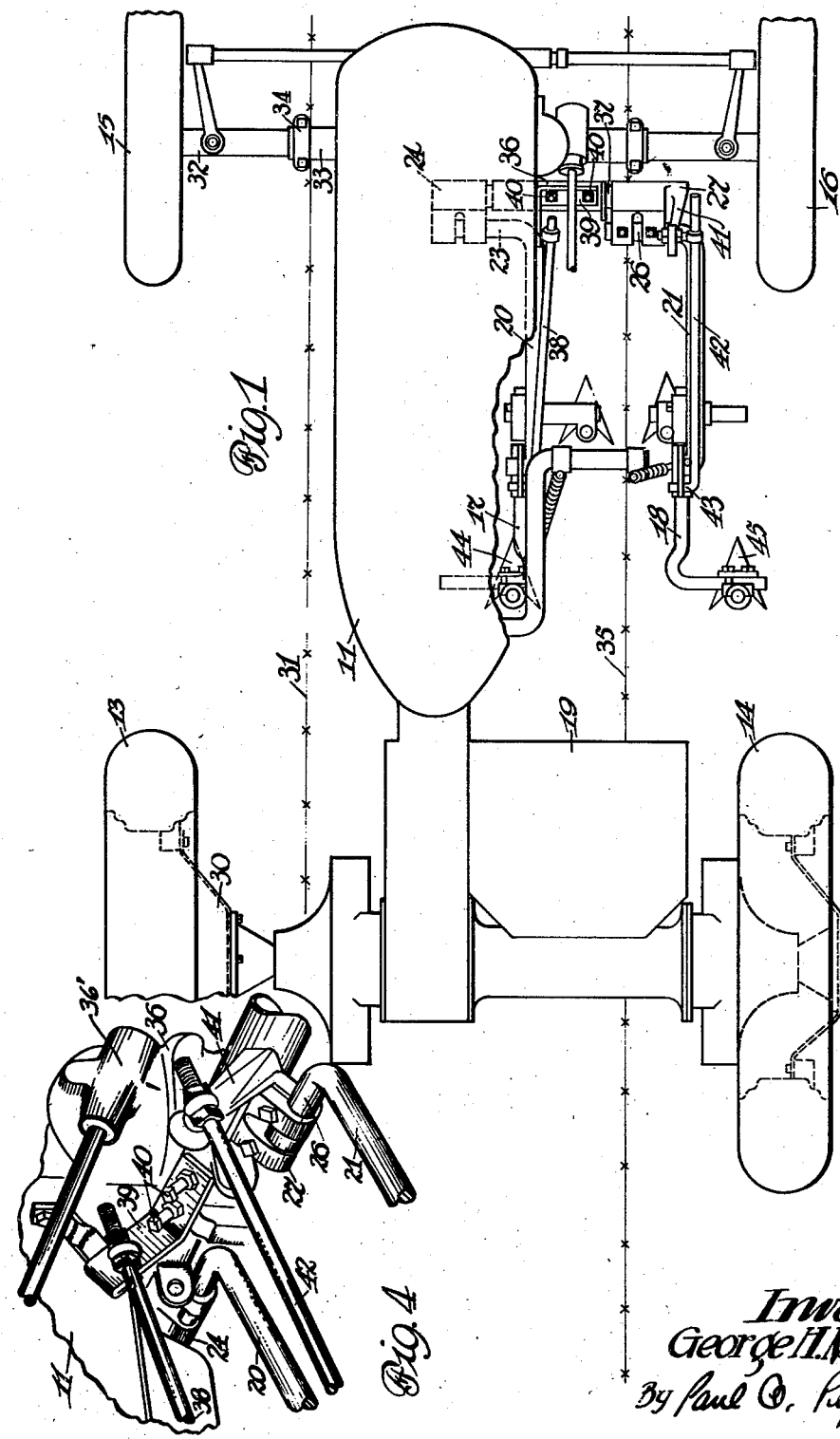
Inventor
George H. Miller
By Paul O. Ruppel.
Atty.

Aug. 21, 1945.  G. H. MILLER  2,383,407
AGRICULTURAL IMPLEMENTS
Filed Aug. 10, 1942  2 Sheets-Sheet 2
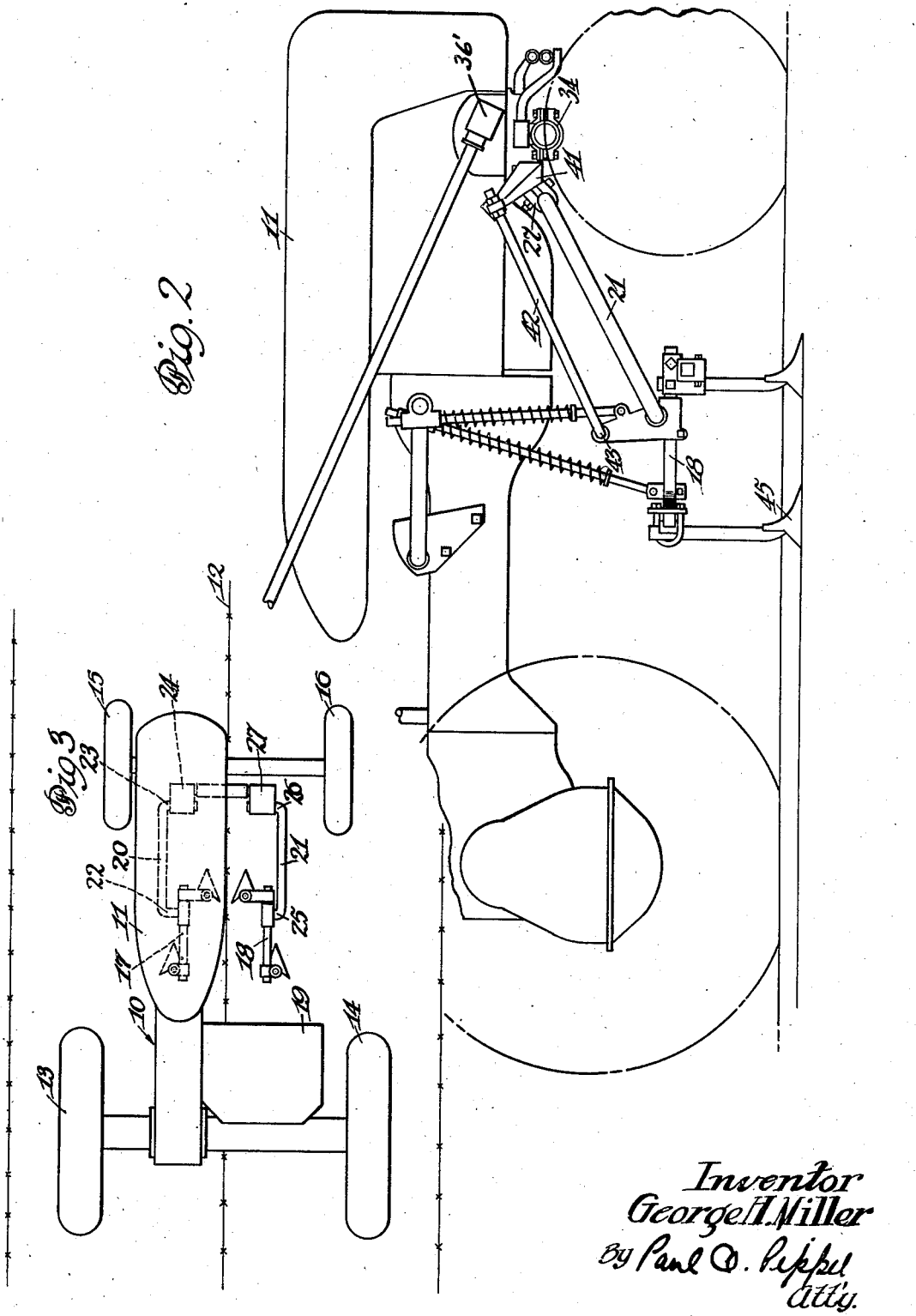
Inventor
George H. Miller
By Paul O. Pippel
Atty.

Patented Aug. 21, 1945

2,383,407

UNITED STATES PATENT OFFICE 2,383,407

AGRICULTURAL IMPLEMENT

George H. Miller, Erie, Pa., assignor to International Harvester Company, a corporation of New Jersey Application August 10, 1942, Serial No. 454,208

1 Claim. (Cl. 97—47)

This invention relates to agricultural implements and more particularly to means for mounting the implements of the closely coupled type upon a tractor-supporting structure.

It is an object of the present invention to provide a novel means for connecting cultivating rigs with tractors of a type having an offset body portion, whereby the entire cultivating arrangement may be converted from an arrangement adapted to cultivate crop rows of normal and wide spacing to a cultivating arrangement adapted for cultivating crop rows which are narrowly spaced.

It is another object of the invention to provide in the means for connecting the cultivating rigs to the tractor a connecting link having transverse portions utilized for making the connections respectively with the rig and with means on the tractor such that this link may be adapted or rearranged so that it will effect lateral adjustment of the cultivating rig for cultivation upon the narrow spaced row.

According to the present invention, the tractor to which the cultivating rigs are to be attached is of the offset type having its wheels so connected to the body portion of the tractor as to be laterally adjustable with respect thereto. In the normal setting of the cultivating rigs for the cultivation of crop rows, spaced say 42 inches apart, the cultivating rigs are arranged to be alined adjacent to a line extending centrally through the tractor. In this setting, the wheels merely travel at opposite sides of the crop row being cultivated. To effect the change desired and to alter the arrangement into an arrangement for cultivating narrow spaced row crops, the wheels on one side of the tractor are adjusted laterally outwardly of the wheels of the tractor so that the tractor will straddle two of the narrowly spaced crop rows. At the same time there is provided in the means for connecting cultivating rigs to the tractor, means for effecting lateral adjustment of the same in the opposite lateral direction from the adjustment of the wheels. The means for effecting the lateral adjustment as to one of the cultivating rigs is by the provision of a connecting link having transversely extending attaching portions whereby the link may be inverted to be located to the opposite side of its hitch point with the tractor and to thereby effect a lateral adjustment of the cultivating rig. The outer cultivator rig has a similar connecting link with transverse portions, but with it lateral adjustment is effected merely by sliding its transversely extending portion laterally outwardly in its bearing portion so that the journal connection of the transverse portion with the bearing will be made at different locations on the transverse portion.

For other objects and for a better understanding of the invention reference may be had to the following detailed description taken in connection with the accompanying drawings, in which:

Figure 1 is a plan view of a combined tractor and cultivating rig arrangement adjusted for the cultivating of narrow spaced rows;

Figure 2 is a view in elevation of the tractor and cultivating rig arrangement as shown in Figure 1;

Figure 3 is a more or less diagrammatical showing of the tractor and its cultivating rigs arranged for cultivating crop rows spaced at the normal row spacings and where the tractor wheels merely straddle a single crop row; and Figure 4 is a fragmentary perspective view of a portion of the tractor and illustrating the connection of the links thereto.

Referring now particularly to Figure 3, there is shown a diagrammatic view of a tractor 10 of the offset type having a longitudinally extending body portion 11 offset with respect to a center line 12 running centrally through the tractor. During the cultivation of the row crop, the tractor runs so that its center line runs directly over the crop row being cultivated, and traction wheels 13 and 14 and steerable forward supporting wheels 15 and 16 respectively straddle the crop rows. On this tractor are mounted cultivating rigs 17 and 18 arranged to be located respectively at opposite sides of the crop row while cultivation is being effected. In this arrangement the cultivating rigs are such that they can be readily viewed by the operator located at an operator's station 19 on the opposite side of the center line 12 of the tractor from the offset body portion. The connection of the cultivating rigs 17 and 18 with the tractor is made by means including connecting links 20 and 21. The connecting link 20 has transversely extending connecting portions 22 and 23. The connecting portion 22 is adapted for attachment to the cultivating rig 17 while the connecting portion 23 is adapted for attachment to a bearing portion 24 on the tractor. The connecting link 21 has similar transverse portions 25 and 26. The transverse portion 25 connects the link with the rig 18, and the transverse portion 26 connects the link with a bearing portion 27 on the tractor, which is laterally spaced from the bearing portion 24 thereof.

Upon referring to Figure 1, it will be noted that each of the respective traction and steerable wheels has means whereby they may be laterally adjusted with respect to the body portion of the tractor. In order to effect a complete conversion of tractor arrangements such as shown in Figure 3 into a tractor arrangement such as shown in the remaining figures adapted for cultivating row crops which are narrowly spaced, it becomes necessary that use be made of this adjusting means associated with each of the adjusting wheels in order that the tractor may be arranged to straddle two of the narrowly spaced crop rows instead of the one crop row as illustrated in Figure 3. The traction wheel 13 is accordingly removed and readapted to be given a wide setting. This is effected through a changing of the wheel on a concave wheel center plate 30. When this wheel 13 is so fastened to the tractor body portion, the same will straddle a row 31, all of this being effected without the necessity of lateral adjustment of the wheel 14. The forward steering wheel 15 can be laterally adjusted by the sliding of its shaft mounting 32 in a sleeve 33 having associated with it a clamping means 34 for retaining the shaft 32 in its adjusted position in the sleeve 33. The steerable wheel 16 does not need to be adjusted.

In order to effect further adjustment and to gain the proper alinement of the cultivating rigs with respect to the offset body portion and into alinement with the crop row 35 to be cultivated, the cultivating rigs need to be readjusted in their connection on the tractor. Associated with the forward portion of the tractor is a casting 36 attached to the steering mechanism housing 36' on the front of the tractor and including a laterally extending stationary shaft 37 having bearing portions 24 and 27 affixed adjacent opposite ends thereof. The connecting link 20 with the ring 18 is removed from its connection with the rig and with the bearing portion 24 and is inverted to enter the bearing portion 24 from the right side of the tractor instead of from the left as shown in Figure 3. The cultivating rig 18 is then connected with the transverse portion 22 of hte link 20. By this adjustment of the link 20, the cultivating rig 18 can be laterally moved to the right. Associated with this link 20 is an upper parallel link 38 connected with the rig and with a bracket structure 39 fastened to the casting 36 by means of clamping bolts 40.

A similar lateral adjustment of the cultivating rig 18 is desired, and this is effected by moving the link 21 a few inches to the right so that the journal connection of its transverse portion 26 will be connected to the bearing portion 27 at another location. On one end of shaft 37 is affixed a vertically extending arm 41 to which an upper link 42 is connected. This link 42 is connected as indicated at 43 to the rig 18. The cultivating rigs 17 and 18 have cultivating tools 44 and 45 thereon. It should now be apparent that means has been provided in the connection of the cultivating rigs with the tractor, such that they may be laterally adjusted with respect to the tractor in order to have further alinement of the cultivating tools with the narrowly spaced crop row 35. As the tractor with the cultivating rig proceeds down the crop row, the crop row 35 will be cultivated. Upon return of the tractor, the tractor wheels will span the identical crop rows, but the working tools 44 and 45 will then operate upon the crop row 31. It should now be apparent that there has been provided a means for converting a cultivating arrangement including a tractor of the offset type and for cultivating crops of standard row spacings, into a cultivating arrangement still utilizing the tractor of the offset type and its cultivating rigs adapted for cultivating row crops which are narrowly spaced as compared to the normal row spacings of 42 inches. These narrowly spaced rows are found with crops other than corn or cotton, such as with beans, beets, and the like, and are of the order of 28 inches apart.

While various changes may be made in the detail construction of the present invention, it shall be understood that such changes shall be made within the spirit and scope of the present invention as defined by the appended claim.

What is claimed is:

In combination, a tractor having laterally spaced wheels, an offset longitudinally extending body portion located to one side of the center line through the tractor, a pair of cultivating rigs when connected to the tractor for the cultivation of widely spaced row crops being located respectively at opposite sides of the center line of the tractor, means for converting the tractor and the cultivating rigs into an arrangement adapted for the cultivation of narrowly spaced crop rows, said converting means including means for connecting the wheels to the tractor for lateral adjustment so that the wheels may be spaced to straddle two of the narrowly spaced crop rows, means for connecting the cultivating rigs to the tractor for translational lateral adjustment thereon including for at least one of the rigs a link having transverse connecting portions invertibly connectable to the tractor for locating its rig laterally removed from its initial position and a transverse bearing member for each link having an opening at each end adapted to receive the transverse portion of said link, whereby the rigs may be rearranged laterally with respect to the adjusted wheels and for proper alinement with the narrowly spaced crop row.

GEORGE H. MILLER.